United States Patent [19]

Johnson et al.

[11] 4,101,624

[45] Jul. 18, 1978

[54] METHOD OF CASTING SILICON

[75] Inventors: Harlan B. Johnson, Rittman;
Aleksandrs Martinsons, Wadswoth;
Cletus N. Welch, Clinton, all of Ohio

[73] Assignee: PPG Industries, Inc., Pittsburgh, Pa.

[21] Appl. No.: 448,589

[22] Filed: Mar. 6, 1974

[51] Int. Cl.² .............................................. C04B 35/60
[52] U.S. Cl. ...................................... 264/273; 249/82;
264/274; 264/299; 264/317
[58] Field of Search ................ 264/59, 111, 125, 221,
264/332, DIG. 44, 60, 313, 317, 241, 274, 273;
164/61; 249/82

[56] References Cited

U.S. PATENT DOCUMENTS 3,506,235  4/1970  Katz et al. .............................. 249/82

*Primary Examiner*—Robert F. White
*Assistant Examiner*—John A. Parrish
*Attorney, Agent, or Firm*—Richard M. Goldman

[57] ABSTRACT

Disclosed is a method of casting silicon metal. Silicon metal expands upon solidification. According to the disclosed method a void volume of from 1 to 10 percent of the silicon metal, basis molten silicon metal, is established within the molten silicon metal. The void volume is capable of being decreased in volume upon the solidification of the silicon metal. In this way, the increase in volume of the silicon metal upon solidification is offset.

4 Claims, No Drawings

METHOD OF CASTING SILICON

BACKGROUND OF THE INVENTION

Silicon metal, including high silicon alloys, are useful in applications where an acid-resistant material is needed. Additionally, silicon and high silicon alloys which have been rendered electroconductive by the presence of a dopant are particularly desirable for electrochemical applications, e.g., electrode substrates. However, in such applications, silicon must frequently be cast into complex and precise shapes. This gives rise to a complication because silicon and silicon alloys containing high amounts of silicon, e.g., in excess of 97 weight percent silicon and even 95 weight percent silicon have a positive coefficient of volumetric expansion upon solidification. By coefficient of volumetric expansion upon solidification is meant $((V_s-V_L)/V_L)\times 100$ where $V_s$ is the volume of the solid silicon, and $V_L$ is the volume of the liquid silicon.

The positive coefficient of expansion upon solidification results in the bulging of the casting as the expanding silicon presses nonuniformly against the walls of the ingot mold. In electrochemical applications, e.g., electrodes, a high degree of dimensional uniformity is required. As a result, the castings must be cut, sawed, or similarly mechanically worked in order to provide dimensional uniformity.

One attempt at solving this problem has been to provide alloys of silicon containing less than 97 weight percent silicon and preferably less than 95 weight percent silicon. This provides a lower volumetric coefficient of expansion upon solidification. While this method has been successful in reducing the volumetric coefficient of expansion upon solidification, the corrosion resistance of the silicon alloy is not enhanced thereby, and may even be deleteriously effected.

SUMMARY

It has now surprisingly been found that silicon may be cast to provide castings having a high degree of dimensional uniformity. This may be accomplished by providing means within the molten silicon to offset the increased volume of the silicon upon solidification. For example, a void volume may be established within the molten silicon. The void volume is capable of then being decreased upon the solidification of the silicon. This serves to offset the increase in volume of the silicon upon solidification.

DETAILED DESCRIPTION OF INVENTION

Silicon and silicon alloys containing high amounts of silicon, i.e., in excess of 97 percent and frequently even in excess of 95 percent are characterized by a positive coefficient of volumetric expansion upon solidification. That is, the alloys increase in volume upon solidification. The method of casting silicon described herein is useful with all high silicon alloy castings, but has its greatest utility in electrically conductive castings, i.e., silicon castings having electrical conductivity greater than 100 (ohm-centimeters)$^{-1}$ and preferably in excess of 1000 (ohm-centimeters)$^{-1}$.

The high electrical conductivity is provided by the presence of a dopant within the alloy. To attain a high electrical conductivity, the alloy contains from about 0.2 weight percent to about 5.0 weight percent of the dopant and preferably from about 0.5 weight percent to about 2.0 weight percent of the dopant. Greater amounts of the dopant do not appear to significantly increase the conductivity of the alloy, and may, under some conditions, decrease the corrosion resistance thereof. Lesser amounts of dopant, e.g., less than about 2.0 weight percent, while increasing the electrical conductivity of the silicon do so to only a limited extent.

The dopants utilized may be electron acceptors such as phosphorus, arsenic, antimony, or bismuth, or electron donors such as boron, aluminum, gallium, indium, or thallium. Most commonly, the lighter dopants, e.g., phosphorus or boron, are utilized. Most frequently the dopant is boron.

Alloying agents may also be present within the alloy. For example, the alloy may contain scandium, yttrium, the lanthanides, titanium, zirconium, hafnium, tantalum, chromium, molybdenum, tungsten, manganese, techentium, rhenium, the iron triad, e.g., iron, cobalt, and nickel, the ruthenium triad, e.g., ruthenium, rhodium, and palladium, the platinum triad e.g., osmium, iridium, and platinum, and the group Ib metals, copper, silver, and gold. Generally, if there are alloying agents, they will be iron, cobalt, nickel, chromium, manganese, molybdenum, or tungsten. Most frequently, the alloying agents will be iron, cobalt, nickel, or tungsten.

The castings prepared according to the method of this invention are dimensionally uniform. That is, they are substantially free of bulges, surface irregularities, pits, bubbles, and the like. Furthermore, the high silicon castings, i.e., containing in excess of 95 weight percent silicon, prepared according to the method of this invention, are substantially free of silicide phases subject to etching and corrosion. Additionally, silicon castings containing up to about 8 weight percent iron are substantially free of internal defects and irregularities which can serve as sites of corrosion when prepared according to the method of this invention.

According to the method of this invention, molten silicon is provided in a vessel suitable for solidifying the silicon. The silicon may be heated and melted in a furnace or crucible and thereafter poured into the vessel, such as an ingot mold. Alternatively, the silicon may be heated and melted directly in the ingot mold.

Thereafter, means are provided within the molten silicon, that is, inside the melt, to offset the increase in volume of the silicon upon solidification. The means for offsetting the increase in volume of the silicon include a void volume within the molten silicon.

The void volume is preferably from about 1.0 volume percent to about 10.0 volume percent of the casting, basis molten silicon. Preferably, the void volume is from about 2.0 volume percent of the molten silicon to about 8.0 volume percent of the casting, basis molten silicon.

Void volumes less than about 1.0 volume percent of the silicon, basis molten silicon, while effective in reducing the amount of internal cracking, etc., still permit some bulging of the silicon casting.

Void volumes greater than about 10.0 volume percent of the silicon, basis molten silicon, may provide too great an internal volume thereby possibly leading to other defects within the casting.

The void volume is capable of being or becoming decreased upon the solidification of the silicon. That is, the void volume is capable of becoming filled with the expanding silicon during the solidification of the silicon during the solidification thereof. The decrease in volume of the void volume, for example by becoming filled with molten silicon, offsets the increase in volume of silicon upon solidification. Preferably, the void volume slowly admits the solidifying silicon to the interior of the void volume.

The void volume may be provided by hollow means, crushable means, compressible means such as graphite or carbon felts, or porous means with small pores, i.e., small enough that surface tension of the silicon is high enough to prevent molten silicon from flowing through under normal conditions but large enough to permit molten silicon to flow through during solidification. Such porous means may be provided by the less dense, more porous grades of graphite, i.e., graphite of an apparent specific gravity less than about 1.15, an effective porosity of greater than about 0.45, and an average pore diameter of from about 0.001 to about 0.010 inch. The porous graphite may provide the walls of the hollow means described herein.

The void volume is most commonly provided by a hollow means. Typically, the hollow means are capable of being slowly crushed by the force of the solidifying silicon or are capable of slowly admitting the silicon to the interior of the hollow means. In this way the void volume is capable of becoming filled with silicon during the solidification of the silicon.

The void volume may be provided by a fully closed hollow body. The fully closed hollow body may be a cylinder, a sphere, a rectangular box, pyramid, or any other form. For simple rectangular castings, where the depth and width are within a ratio of about 1 to 1 to about 1 to 20 of each other, the void volume may be provided by either cylindrical or rectangular means. However, other more complex casting shapes may suggest the use of more complex shapes for the structure providing the void volume.

The void volume is provided by a structure fabricated of a material that is insoluble or only sparingly soluble in molten silicon or slowly reactive with molten silicon. That is, it is provided by a material that is only partially solubilized by or reacted with molten silicon within the 15 seconds to two minutes that the molten silicon is in contact therewith. Such materials include carbonaceous materials, silicon carbide, graphite coated metals, graphite coated refractories, and refractory intermetallic compounds such a carbides, borides, nitrides, and silicides. Most commonly, carbonaceous materials are used. Typical carbonaceous materials suitable for providing the walls of the void volume include carbon, graphitized carbon, and graphite.

Where the hollow body is provided by carbon or graphite, the wall thickness is typically from about 1/64 inch to about 1/16 inch.

After establishing the void volume within the molten silicon, the molten silicon is thereafter cooled and permitted to solidify. That is, the silicon is cooled from above the melting point thereof, about 1400° Centigrade, to below the melting point thereof.

Typically, in casting molten silicon, silicon is melted in a crucible or within a furnace. The ingot mold is then heated, e.g., to in excess of 400° Centigrade or more, frequently as high as 650° or 700° or even 800° Centigrade. The structural member providing the void volume, i.e., a hollow carbonaceous closed body such as a cylinder or rectangle is placed in the ingot mold. Thereafter, the silicon is poured into the ingot mold and permitted to rise within the ingot mold. The ingot mold is then slowly cooled from the melting point to between about 1000° to 1200° Centigrade and maintained thereat until substantially all of the silicon is solidified. Thereafter, the silicon is rapidly cooled below about 800° Centigrade. In this way, a particularly satisfactory silicon ingot is provided. The silicon ingot is characterized by the substantial absence of internal fissures, defects, cracks, bubbles, or the like and the substantial absence of surface bulges. Additionally, the silicon ingot or casting is characterized by high electrical conductivity, i.e., on the order of at least 100 $(ohm-cm)^{-1}$, and preferably in excess of about 1000 $(ohm-cm)^{-1}$. Such silicon casting is further characterized by the presence of a dopant in an amount from about 0.1 weight percent to about 2.0 weight percent. The silicon casting may also be characterized by the presence of up to about 5 weight percent or even up to about 8 weight percent of other alloying elements.

The details of this invention may be more fully understood by reference to the following example.

EXAMPLE

A silicon ingot containing 0.42 weight percent boron, balance silicon, was prepared by pouring the molten silicon into a preheated ingot mold and providing a void volume within the molten silicon.

Two Number 10 graphite crucibles were each charged with 2200 grams of Ohio Ferro Alloys silicon and 41 grams of Fisher Scientific sodium tetraborate. The crucibles were then heated in an oven controlled at 1520° Centigrade providing a molten silicon temperature of about 1460° Centigrade for 2 hours, the slag skimmed off, and the molten silicon poured into a single Number 10 crucible. The single Number 10 crucible was then heated at 1520° Centigrade for 75 minutes.

A graphite box was prepared of 1/32 inch thick graphite. The graphite box had an inside void volume of $\frac{1}{2}$ inch by $1\frac{3}{4}$ inches by $2\frac{3}{4}$ inches providing an inside void volume of 2.41 cubic inches. A hole was drilled in the bottom of the graphite box and a 154 inch diameter graphite rod was installed in the box extending from the interior surface of the top of the box through the bottom surface of the bottom of the box to provide a means for anchoring the hollow graphite box in the ingot mold. The resulting interior void volume of the graphite box was 2.10 cubic inches.

A graphite ingot mold was then fabricated from $\frac{1}{2}$ inch thick graphite. The ingot mold had inside dimensions of $1\frac{1}{4}$ inches by $6\frac{1}{4}$ inches by 11 inches and an interior volume of about 85.6 cubic inches.

The two halves of the ingot mold were held together by stainless steel bands and the bottom of the hollow rectangular graphite box was spaced $4\frac{1}{4}$ inches from the bottom of the mold. The ingot mold was then placed in a furnace, heated to 900° Centigrade, and held at 900° Centigrade for approximately 30 minutes.

The molten silicon was then poured into the preheated ingot mold and the ingot mold was maintained in the furnace at a set temperature of 900° Centigrade for 1 hour. The ingot mold containing the now solidified silicon was removed from the furnace and permitted to cool in air.

The resulting ingot appeared to be fracture-free and bulge-free when removed from the ingot mold. Thereafter, the ingot was cut transversely 5 inches from the bottom. The hollow graphite rectangular box insert appeared to be completely filled with silicon. No cracks, fractures, or other internal defects were noted in the ingot.

We claim:

1. A method of casting a metal selected from the group consisting of silicon and silicon alloys containing in excess of 95 percent silicon, said metal having volumetric expansion upon solidification, comprising:
 placing a hollow body containing one or more voids in a mold, said body being spaced from the interior surfaces of said mold and having a void volume of from about 1.0 to about 10.0 volume percent of the casting, basis the molten silicon;
 pouring said metal in a molten state into said mold and around said hollow body disposed in said mold; and
 cooling said molten metal in said mold below the melting point thereof, until pressure exerted by expansion of the cooling solid metal on the molten metal in the interior of said casting forces said molten metal into the voids of said hollow body until the voids of said hollow body are substantially filled with silicon.

2. A method of casting silicon metal having a positive coefficient of volumetric expansion upon solidification comprising:
 providing a hollow body insert capable of becoming filled with silicon metal during the solidification of the silicon, said insert having a volume of from one to ten percent of the molten silicon to be cast, in a vessel suitable for solidifying molten silicon;
 pouring molten silicon above about 1400° C. into the vessel; and
 cooling said silicon below the melting point thereof whereby to obtain a substantially solid casting.

3. A method of casting silicon metal having a positive coefficient of volumetric expansion upon solidification comprising:
 providing a hollow body capable of being crushed by expansion of the solidifying silicon metal, said body having a volume of from one to ten percent of the molten silicon to be cast, in a vessel suitable for the solidification of molten silicon;
 pouring molten silicon above about 1400° C. in the vessel; and
 cooling said silicon below the melting point thereof whereby to obtain a substantially solid casting.

4. A method of casting silicon metal having a positive coefficient of volumetric expansion upon solidification comprising:
 providing a carbon body having an apparent specific gravity less than about 1.15, an effective porosity greater than about 0.45, and a volume of from one to ten percent of the molten silicon to be cast in a vessel suitable for solidifying molten silicon;
 providing molten silicon above about 1400° C. in the vessel; and
 cooling said silicon below the melting point thereof whereby to obtain a substantially solid casting.

* * * * *